United States Patent [19]
Upp et al.

[11] Patent Number: 5,608,731
[45] Date of Patent: Mar. 4, 1997

[54] CLOSED LOOP CLOCK RECOVERY FOR SYNCHRONOUS RESIDUAL TIME STAMP

[75] Inventors: Daniel C. Upp, Southbury, Conn.; Dan H. Wolaver, West Brookfield, Mass.

[73] Assignee: TranSwitch Corporation, Shelton, Conn.

[21] Appl. No.: 414,502

[22] Filed: Mar. 31, 1995

[51] Int. Cl.$^6$ .................................................. H04L 7/08
[52] U.S. Cl. ........................ 370/516; 370/518; 370/395; 375/376
[58] Field of Search .................................. 370/60.1, 94.2, 370/79, 100.1, 105.2, 105.3; 375/354, 356, 362, 371, 376

[56] References Cited

U.S. PATENT DOCUMENTS

| | | | |
|---|---|---|---|
| 4,961,188 | 10/1990 | Lau | 370/94.2 |
| 5,007,070 | 4/1991 | Chao et al. | 370/105.3 X |
| 5,204,882 | 4/1993 | Chao et al. | 370/94.1 X |
| 5,260,978 | 11/1993 | Fischer et al. | 375/106 |
| 5,396,492 | 3/1995 | Lien | 370/60 |

OTHER PUBLICATIONS

"Adaptive Clock Synchronization Schemes for Real Time Traffic in Broadband Packet Networks", Singh et al., Bell Communications Research.

"Jitter and Clock Recovery for Periodic Traffic in Broadband Packet Networks", Singh et al., Bell Communications Research, Inc.

"Jitter Reduction in ATM Networks", Gonzales et al. Centre National D'Etudes des Telecommunications, France, 1991.

*Primary Examiner*—Douglas W. Olms
*Assistant Examiner*—Russell W. Blum
*Attorney, Agent, or Firm*—David P. Gordon

[57] ABSTRACT

An SRTS clock recovery apparatus and method are provided. The apparatus broadly includes a controllable destination node clock generator such as a digitally controllable oscillator, a block for generating a local RTS-related value from the destination node clock and the system reference clock, and a comparator which compares the incoming RTS-related value to the local RTS related value to provide a feedback error or control signal which is used to adjust the controllable clock generator. If desired, a filter which filters the error signal can be provided in the loop. With the feedback loop as provided, when the destination node clock is faster than the source clock, the error signal will cause the destination node clock to slow, and vice versa.

24 Claims, 3 Drawing Sheets

CLOSED LOOP CLOCK RECOVERY FOR SYNCHRONOUS RESIDUAL TIME STAMP

BACKGROUND OF THE INVENTION

1. Field of the Invention

The present relates generally to the recovery of a source node service clock at a destination node in a broadband asynchronous transfer mode (ATM) telecommunications network where reference timing signals derived from a master clock are available to both the source and destination nodes. More particularly, the present invention relates to apparatus and methods utilizing closed loop clock recovery for source frequencies which have been encoded according to a synchronous residual time stamp (SRTS) encoding technique.

2. State of the Art

Asynchronous Transfer Mode (ATM) is a packet oriented technology which permits continuous bit rate signals carrying one or more of voice, video, and data, to be conveyed across a netowrk within packets. ATM is suitable for the transport of bursty traffic such as data, as well as accommodating constant or continuous bit rate signals. In delivering continuous bit rate traffic (e.g., T1, DS3 signals) in a broadband network, the clock controlling the destination node buffer must operate at a frequency precisely matched to that of the service signal input at the source node in order to avoid buffer overflow or underflow and resulting loss of data. However, the clock frequency at the destination node cannot easily be traced directly back to that of the source, because the ATM network inherently introduces cell jitter; i.e., random delay and aperiodic arrival of cells at a destination node, which corrupts the value of the cell arrival times and makes their use more difficult as a means for directly recovering the original service signal input frequency.

Numerous schemes have been proposed to provide a mechanism for recovering service timing in the presence of cell jitter. Descriptions of many of these schemes are provided in Fleischer et al. U.S. Pat. No. 5,260,978, which is hereby incorporated by reference in its entirety herein. Perhaps the most elegant and widely accepted of the clock recovery schemes is known as synchronous residual time stamp (SRTS) encoding which is the subject matter of the Fleischer et al. patent.

In the preferred embodiment of SRTS encoding according to Fleischer et al., a free-running four bit counter is used at the source node to count cycles of a common network clock. At the end of every residual time stamp (RTS) time period formed by 3008 service clock cycles (i.e., eight cells of forty-seven bytes of data each), the current four bit count of the P-bit counter is transmitted in the ATM adaptation layer (AAL1) by using one bit in every other of byte of the AAL1 for eight cells. It should be noted that the AAL1 is the overhead byte which accompanies the forty-seven bytes of data to constitute the forty-eight-byte payload of an ATM cell. The ATM cell also includes five additional bytes of header. The four-bit SRTS provides sufficient information for unambiguously representing the number of network clock cycles within a predetermined range.

The clock recovery at the destination node according to Fleischer et al. involves determining from the received RTSs the number of network clock cycles in each RTS period, and generating a pulse signal from the network clock in which the period of the pulse equals the determined number of network clock cycles in the corresponding RTS period. The pulse signal frequency is then multiplied by 3008 in order to recover the source node service clock.

While the clock recovery mechanism of Fleischer et al. might be suitable for recovering the source node service clock, it is neither the only recovery mechanism possible, nor necessarily the most optimal mechanism for recovering the source node service clock.

SUMMARY OF THE INVENTION

It is therefore an object of the invention to an apparatus and method for the closed loop recovery of a source node clock which has been SRTS encoded.

It is another object of the invention to provide an SRTS clock recovery algorithm which is readily implementable by microprogramming a generalized hardware architecture.

It is a further object of the invention to provide an SRTS clock recovery algorithm which does not rely upon the generating of pulse signals at the network node, and the multiplying of the frequency of the pulse signal generated.

In accord with the objects of the invention, the SRTS clock recovery apparatus of the invention broadly includes a controllable destination node clock generator, a means for generating a local RTS-related value from the destination node clock and the system reference clock, and a means for comparing the incoming RTS-related value to the local RTS-related value to provide a feedback error or control signal, where the control signal is used to adjust the destination node clock generator. With the feedback loop as provided, when the destination node clock is faster than the source clock, the error signal will cause the destination node clock to slow, and vice versa.

In accord with preferred aspects of the invention, the means for generating the local RTS-related value includes a digitally controllable oscillator, and the SRTS recovery apparatus further includes processing means for filtering and processing the error signal in order to provide a digital control signal to the digitally controllable oscillator. The digitally controlled oscillator is typically arranged such that its typical rate is the nominal rate of the signal being sent from the source (e.g., a 1.544 MHz rate for a T1 signal). The digital control signal is arranged to cause the digitally controlled oscillator to increase or decrease the nominal rate in steps of less than 1 ppm at a time, up to at least the permissible limits for the particular telecommunications signal.

Additional objects and advantages of the invention will become apparent to those skilled in the art upon reference to the detailed description taken in conjunction with the figures.

DETAILED DESCRIPTION OF THE PREFERRED EMBODIMENT

Figure 1:
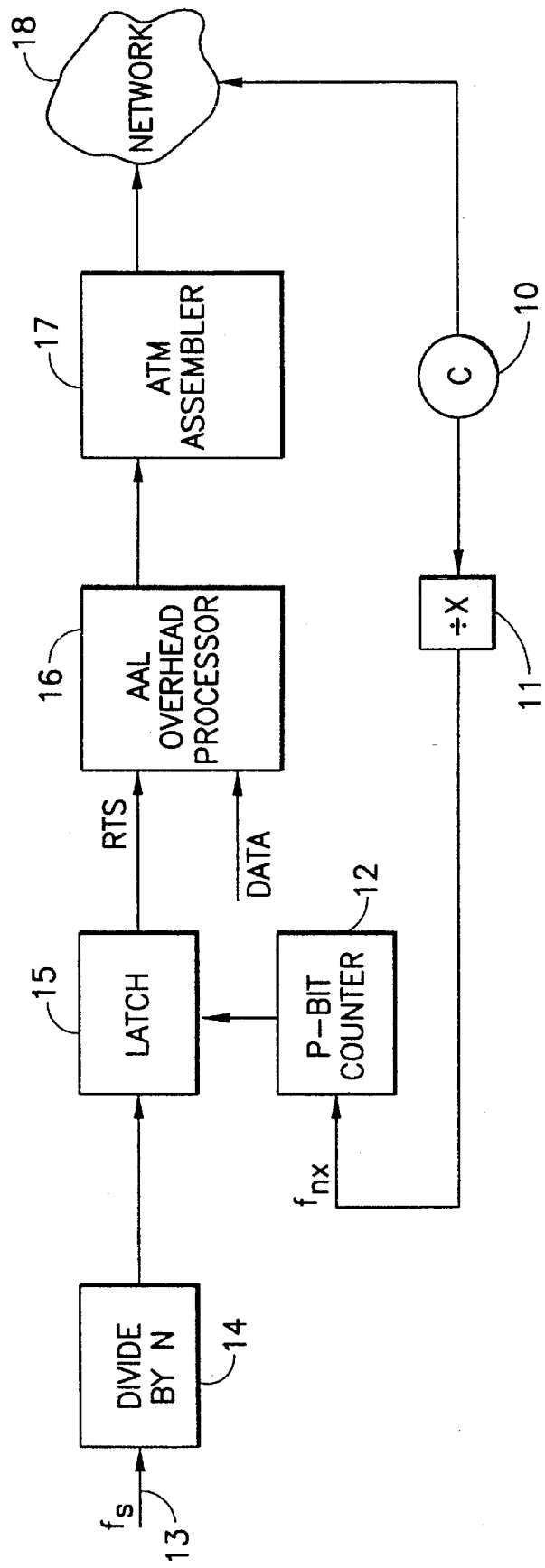
FIG. 1 is a prior art block diagram of an apparatus for generating the RTS at the source node of an ATM network.

Turning to FIG. 1, a prior art diagram of an apparatus for generating the RTS at the source node of an ATM network is seen. In particular, the basic network clock C shown at 10 serves as the reference for timing all nodes of the synchronous network being considered. This clock, having a frequency $f_n$ is divided in frequency by a rational factor x by a divider 11 to produce a derived network clock having a frequency $f_{nx}$. Preferably, x is an integer value (e.g., 16). The derived network clock $f_{nx}$ is fed to a P-bit counter 12 which continuously counts the clock pulses modulo $2^P$. Thus, where P is the value four, the counter 12 counts from zero to fifteen.

According to the SRTS technique, the source or service clock on lead 13, having a frequency $f_s$ is divided in frequency by a value N by a divider 14. A typical value for N is 3008 which corresponds to a period of eight cells and a forty-seven byte payload per cell (47×8×8=3008). The output of the divide by N block 14 is a pulse signal which is provided to a latch 15 and is used to latch in the count of the P-bit counter 12 which is continuously being provided to the latch 15. Thus, at every N source clock cycles, the latch 15 samples the current count of the counter 12, and the latched count is the current P-bit-RTS which is to be transmitted.

Each successive RTS value is incorporated within the ATM adaptation layer overhead by the AAL processor 16. Since the RTS represents the residual for eight ATM cells, one RTS bit is preferably provided in every other overhead byte of the ATM payload. The associated data to be transmitted is also processed by processor 16 to form the payload of the cells which are then assembled by an ATM assembler 17 which adds an ATM header for transmission over the network 18.

As explained in the Fleischer et al. patent, since the counter 16 in effect quantizes by truncation, the RTS changes by integer values. The changes, on average, are exactly equal to the nominal number of derived network clock pulses in an RTS period $M_{nom}$ [modulo $2^P$], where $M_{nom}=N(f_{nx}/f_s)$.

Figure 2:
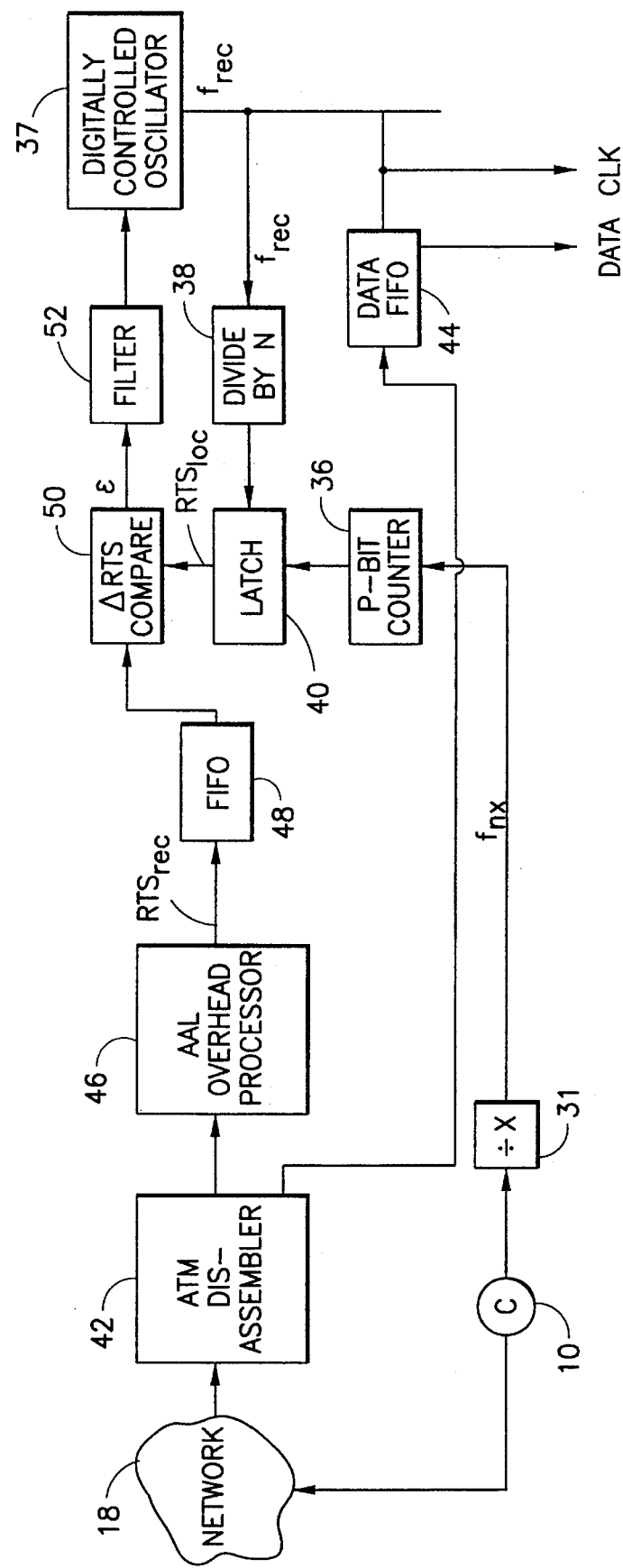
FIG. 2 is a block diagram of the apparatus of the invention for reconstructing the service clock at the destination node of an ATM network.

Turning now to FIG. 2, the apparatus and method of the invention for recovering the source clock $f_s$ at the destination node are seen and described. Broadly speaking, the method of the invention is to generate at the destination node a local RTS value using the network clock $f_n$ and a derived (recovered) destination clock $f_{rec}$, compare the local RTS value (or more preferably a delta change thereof) to the incoming RTS value (or a delta change thereof), and use the difference $\epsilon$ as an error feedback to control the recovered destination clock $f_{rec}$. It is noted that at first, the destination clock is set to the expected nominal frequency of the source signal.

More particularly, in generating a local RTS, the basic network clock 10 is shown divided by x at block 31 and fed to the P-bit counter 36. The recovered clock $f_{rec}$ which is generated by a digital controlled oscillator 37 is fed to a divide by N block 38. The pulse output of the divide by N block 38 is used as an input to the latch 40 in order to latch in the count of the P-bit counter 36 which is continuously being fed to the latch 40. As a result, a local RTS ($RTS_{loc}$) is obtained. It is noted that the values of x for the divide by x block 31, P for the P-bit counter 36, and N for the divide by N block 38 are all set to be equal to the x, P and N of the source RTS generator.

The incoming ATM cell received by the ATM disassembler 42 from the network 18 is disassembled according to known techniques, with the data being sent to a data FIFO 44, and the overhead being sent to the AAL overhead processor 46. Typically over an eight-cell period, the AAL overhead processor 46 recovers the four-bit RTS value ($RTS_{rec}$) which is then forwarded to the $RTS_{rec}$ FIFO 48. The respective local RTS sample value can then be compared to the incoming ATM cell RTS sample value (or as explained in more detail with respect to FIG. 3, the delta changes in RTS values are more preferably compared) at comparator 50 in order to produce an error difference term which is used to determine whether the locally recovered clock $f_{rec}$ is faster, slower, or exactly at the same rate as the source clock $f_s$. The numeric difference $\epsilon$ between the RTS (or delta RTS) values is then used in feedback as a control for the recovered clock $f_{rec}$. In particular, if desired, the difference signal $\epsilon$ can be first filtered by a filter 52 in order to remove jitter, and the filtered feedback signal is sent to the digital controlled oscillator 37 to adjust the frequency of the recovered clock signal $f_{rec}$. As suggested by FIG. 2, the recovered clock signal $f_{rec}$, is typically used to clock data out of the data FIFO, and is used in conjunction with the data signal to form a recovered synchronous signal.

Figure 3:
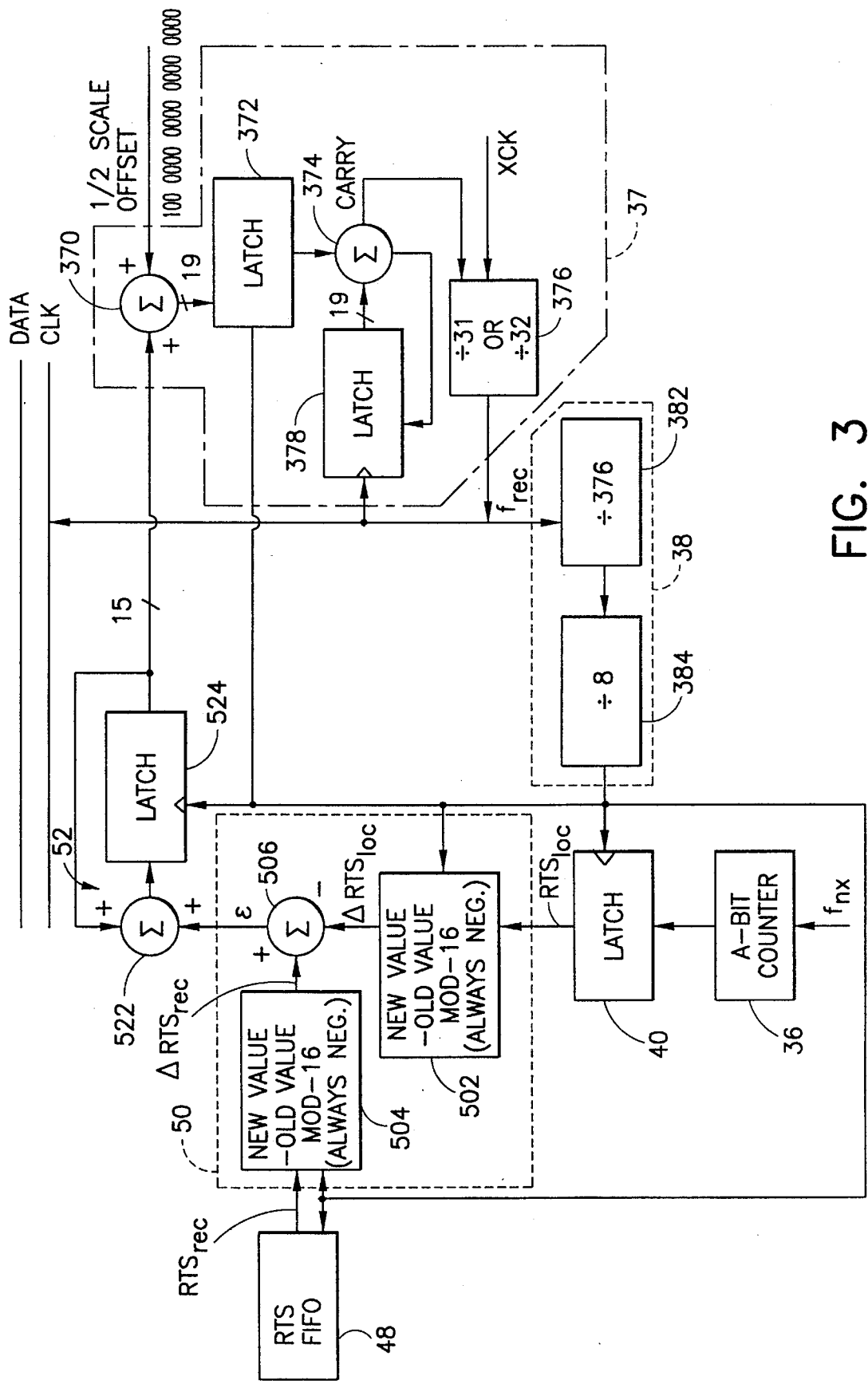
FIG. 3 is a more detailed block diagram of several components of the apparatus shown in FIG. 2.

Turning to FIG. 3, additional details of the digitally controlled oscillator 37, divide by N block 38, RTS compare block 50, and filter 52 of the destination node of FIG. 2 are seen with reference to a T1 clock of 1.544 MHz which is to be recovered. The digitally controlled oscillator 37 is shown as including a half-scale offset summer 370, a first latch 372, a carry control summer 374, a divide by thirty-one or thirty-two logic divider 376, and a second latch 378. The oscillator 37 functions as follows. The clock signal XCK of nominal frequency 48.636 MHz is generated by an external oscillator (not shown), and is divided by thirty-one or thirty-two at divide block 376 in order to generate the recovered clock $f_{rec}$. When the divide block 376 alternates the division (i.e., effectively divides by 31.5), the nominal rate of $f_{rec}$ is the nominal T1 1.544 MHz rate. If the division ratio is changed slightly from the alternating pattern, a change in frequency $f_{rec}$ is effected. As discussed below, the feedback error from the RTS compare block 50 is used to control the divide ratio and thus to adjust the rate of the source node frequency $f_s$.

Control of the divide by thirty-one or thirty-two block 376 is via the summation means 370, latch 372, summer 374 and latch 378. In particular, in the absence of any error signal, summer 370 is provided with a nineteen bit half-scale offset (100 0000 0000 0000 0000) which is fed to latch 372. At every cycle of the local clock $f_{rec}$, the value in latch 378 is added to the value in latch 372 by summer 374. Thus, in the absence of an error signal, the summer 374 will generate a carry signal control every other local clock signal, and the value in latch 378 as provided by the summer 374 will alternate between the half scale value 100 0000 0000 0000 0000 and a nineteen bit zero value. The carry signal is then used to control whether a divide by thirty-one or a divide by thirty-two is to be executed by the divide block 376, with the carry signal causing a divide by thirty-one, and the absence of a carry signal causing a divide by thirty-two. As stated above, in the absence of an error signal, the divide block will divide, on average, by 31.5, causing a 1.544 MHz $f_{rec}$ to be generated from the 48.636 MHz oscillator signal XCK.

It will be appreciated that when an error signal is provided to the digitally controlled oscillator, the value at summer 370 will not be exactly the half-scale offset value. Thus, when the incoming error signal is positive, the summer will provide a value of more than 100 0000 0000 0000 0000 to the latch. The result of continued positive error signals will be that the carry signals will be generated more often than would otherwise occur, as the error values are effectively accumulated in the latch 378 over numerous clock cycles. When the carry signals are generated more often, the divide by thirty-one is conducted more often, and the frequency of the resulting recovered clock $f_{rec}$ is increased.

Details of how the error feedback signal is generated are best understood with reference to the RTS compare block 50, and the filter 52. In particular, as discussed above with reference to FIG. 2, a divided network clock $f_{nx}$ is fed continuously into the four bit counter 36. The count of the counter 36 is latched into the latch 40 when latch 40 receives a pulse from the divide by N block 38 (which is shown as constituting a divide by three hundred seventy-six block 382 in series with a divide by eight block 384; i.e., a divide by 3008). The resulting count is effectively a local RTS value ($RTS_{loc}$) which is preferably compared to (subtracted from) in a first comparator (differencer) 502 the previous local RTS value to provide a local RTS delta ($\Delta RTS_{loc}$). Since in T1 situations, the value of the present local RTS value will always be less than the value of the previous local RTS value, the result will be negative. However, since the comparator in the preferred embodiment is a mod-16 comparator, the output of the comparator will be a positive value. For example, if the previous local RTS value was seven, and the present local RTS value is four, the output of comparator 502 would be thirteen (or 1100 in a digital scale).

Every N local clock cycles, the new incoming RTS as reconstructed by the AAL overhead processor 46 (see FIG. 2) and stored in the RTS FIFO 48 ($RTS_{rec}$) is likewise compared in a mod-16 comparator 504 to the previous incoming RTS. Again, the negative sum is converted into a positive value by the comparator mod-16 comparator 504. The resulting delta ($\Delta RTS_{rec}$) is provided to summer (subtractor) 506 where it is compared to the local RTS delta, and a four-bit-wide error signal $\epsilon$ is generated. When the source clock $f_s$ and the recovered clock $f_{rec}$ are equal, the difference (error) will on the average be zero. When the source clock is faster than the recovered clock, the difference will be positive; and when the source clock is slower than the recovered clock, the error difference will be negative.

It should be appreciated by those skilled in the art, that in obtaining the error signal $\epsilon$, the delta processing carried out by comparators (differencers) 502 and 504, and the summing function carried out by summer 506 can be rearranged such that only one comparator (differencer) and one summer (subtracter) is required. In particular, by first subtracting the local RTS value from the received RTS value, a difference is obtained which may then be processed by the comparator (differencer) by subtracting it from a previously obtained difference. The resulting error signal $\epsilon$ will be exactly as previously defined.

Regardless of how obtained, the error signal $\epsilon$ is preferably filtered by filter 52 prior to being sent as a control signal to the digitally controlled oscillator 37. Thus, an additional summer 522 and latch 524 are provided to act as an integrator which accumulates the error, thereby effectively filtering out some of the jitter in the error. It should be noted that where the source clock is faster than the recovered clock, and the error signal is positive, the filter 52 will provide a positive (preferably fifteen bit wide) signal to the half-scale summer 370 of the digitally controlled oscillator. As a result, the digitally controlled oscillator will increase the frequency of the recovered clock $f_{rec}$ as positive inputs to summer 370 will cause more divides by thirty-one by the divide block 376 than would otherwise occur (as described above). By providing the digitally controlled oscillator with nineteen bits, the resolution of the digitally controlled oscillator for a 1.544 MHz clock recovery is approximately 0.094 Hz. It is noted that by providing the maximum error signal to summer 370 as a signed fifteen-bit- wide signal, the frequency of $f_{rec}$ may be changed as much as ±3080 Hz, well beyond the required range.

It will be appreciated that the apparatus of FIGS. 2 and 3 is readily implementable by those skilled in the art in specialized digital logic which is customized to the described functions. The specialized digital logic may take the form of either an LSI, or discrete logic components. However, the apparatus of FIGS. 2 and 3 may also be implemented in a general purpose programmable machine such as a DSP.

There has been described and illustrated herein an apparatus and method for the clock recovery of a source clock which has been SRTS encoded. While particular embodiments of the invention have been illustrated and described, it is not intended that the invention be limited thereto, as it is intended that the invention be as broad in scope as the art will allow and that the specification be read likewise. Thus, while the destination clock recovery circuit was described with reference to the recovery of a T1 signal, it will be appreciated that similar circuits could be used to recovery the clocks of other types of synchronous signals. The major changes to recovering the clocks of other such synchronous signals would be in the digitally controlled oscillator where a different divide block (such as might be suggested by commonly owned U.S. Pat. Nos. 5,033,064 and 5,289,507) and/or using different scale offsets would be used. In addition, it will be appreciated that different amounts of resolution could be utilized for T1 or other synchronous clock recovery, and that other circuits could be utilized to embody the digitally controlled oscillator. In fact, rather than using a digitally controlled oscillator, a voltage controlled oscillator (VCXO) could be utilized, with the digital error feedback being translated into an analog voltage signal. Further, it should be appreciated that while the preferred means for generating an error signal includes means for generating delta RTS values for the incoming and local RTS values, and means for comparing the delta RTS values, it should be appreciated that other means for comparing the incoming RTS related value to the local RTS related value to provide an error signal can be provided. Thus, the actual incoming and local RTS values can be directly compared if desired. Also, it will be appreciated that in signals other than T1, the delta RTS may not always be negative. Additionally, it should be appreciated that filters other than shown could be used for filtering the error signal, and that, in fact, no filters are necessarily required to practice the invention. Finally, it should be noted that should a different SRTS technique be utilized (e.g., using a different number of bits, and a different value N), the method and apparatus of the invention will still accurately provide a recovered clock provided that the SRTS technique used to generate the local SRTS is the same as the SRTS technique used at the source node. However, it might be necessary to change details of the circuit, such as using different comparators (other than mod-16). It will therefore be appreciated by those skilled in the art that yet other modifications could be made to the provided invention without deviating from its spirit and scope as so claimed.

We claim:

1. An apparatus for the recovery of a source clock which has been encoded utilizing the source clock and a system reference clock according to a synchronous residual time stamp (SRTS) algorithm, where the encoding generates residual time stamp (RTS) values which are obtained by said apparatus as incoming RTS values, said apparatus comprising:

a) controllable oscillator means for generating a destination node clock;

b) means for generating local residual time stamp related values, said means for generating utilizing said destination node clock and the system reference clock; and c) control signal generating means coupled in a feedback loop between said means for generating and said controllable oscillator means, said control signal generating means including first comparison means for comparing incoming RTS-related values which are related to the incoming RTS values to the local RTS-related values, said control signal generating means for generating feedback control signals to said controllable oscillator means which are used by said controllable oscillator means to adjust said destination node clock.

2. An apparatus according to claim 1, wherein:

said local RTS-related values are actual local RTS values, and said incoming RTS-related values are said actual incoming RTS values.

3. An apparatus according to claim 1, where said source clock was divided by a value N and said system reference clock was divided by a value x and fed to a P-bit counter in generating said RTS values, wherein:

said means for generating local residual time stamp related values includes
a first divider means for dividing said destination node clock by said value N,
a second dividing means for dividing the system reference clock by said value x to provide a system related clock,
a mod-$2^P$ counting means for counting cycles of said system related clock, and
a latch means coupled to said mod-$2^P$ counting means and to said first divider means, said latch means for latching P-bit values of said mod-$2^P$ counting means whenever said first divider means generates an output pulse, said P-bit values being local RTS values.

4. An apparatus according to claim 1, wherein:

said controllable oscillator means is a digitally controllable oscillator means, and said feedback control signals are digital feedback control signals.

5. An apparatus according to claim 4, wherein:

said controllable oscillator means comprises
a first summing means having a scale offset input for summing said digital feedback control signals with said scale offset input to provide a first sum,
a second summing means having a second sum output and carry output,
a latch means coupled to said second summing means for receiving said second sum output and for providing said second sum output to said second summing means for summing with said first sum, and
a dividing means for dividing a fast clock by a first value when said carry output is a first value, and for dividing the fast clock by a second value when said carry output is a second value, an output of said dividing means providing said destination node clock.

6. An apparatus according to claim 5, wherein:

said fast clock is a substantially 48.636 MHz clock, and said first value is thirty-one, and said second value is thirty-two.

7. An apparatus according to claim 1, wherein:

said control signal generating means comprises a second comparison means for comparing a new local RTS values to previous local RTS values and generating a delta local RTS values, said delta local RTS values constituting said local RTS-related values, and said control signal generating means further comprises a third comparison means for comparing new RTS incoming values to previous RTS incoming values and generating delta incoming RTS values, said delta incoming RTS values constituting said incoming RTS-related values.

8. An apparatus according to claim 7, wherein:

said second comparison means comprises a mod-16 comparator, and said third comparison means comprises a mod-16 comparator.

9. An apparatus according to claim 7, wherein:

said first comparator means generates error signals which constitute said feedback control signals to said controllable oscillator means.

10. An apparatus according to claim 7, wherein:

said first comparator means generates error signals, and said control signal generating means further comprises filter means for filtering said error signals and generating therefrom said feedback control signals.

11. An apparatus according to claim 7, wherein:

said controllable oscillator means is a digitally controllable oscillator means, and said feedback control signals are digital feedback control signals.

12. An apparatus according to claim 11, wherein:

said controllable oscillator means comprises
a first summing means having a scale offset input for summing said digital feedback control signals with said scale offset input to provide a first sum,
a second summing means having a second sum output and carry output,
a latch means coupled to said second summing means for receiving said second sum output and for providing said second sum output to said second summing means for summing with said first sum, and
a first dividing means for dividing a fast clock by a first value when said carry output is a first value, and for dividing the fast clock by a second value when said carry output is a second value, an output of said dividing means providing said destination node clock.

13. An apparatus according to claim 12, wherein:

said fast clock is a substantially 48.636 MHz clock, and said first value is thirty-one, and said second value is thirty-two.

14. An apparatus according to claim 13, where said source clock was divided by a value N and said system reference clock was divided by a value x and fed to a P-bit counter in generating said RTS values, wherein:

said means for generating local residual time stamp related values includes
a second dividing means for dividing said destination node clock by said value N,
a third dividing means for dividing the system reference clock by said value x to provide a system related clock,
a mod-$2^P$ counting means for counting cycles of said system related clock, and
a latch means coupled to said mod-$2^P$ counting means and to said second divider means, said latch means for latching P-bit values of said mod-$2^P$ counting means whenever said second divider means generates an output pulse, said P-bit values being local RTS values.

15. A system in a packet-based telecommunications network for generating at a destination node a destination clock signal equivalent to a source clock signal of the source node, the destination node and source node having a common network clock, said system comprising:

a) at the source node, first dividing means for dividing said source clock signal by a factor of an integer N to form residual time stamp periods;

b) at the source node, first counting means coupled to the network clock for counting network clock cycles modulo $2^P$;

c) at the source node, transmitting means, responsive to said residual time stamp periods and the count of said first counting means, for transmitting over the telecommunications network a residual time stamp at the end of each residual time stamp period, said residual time stamp being equal to the modulo $2^P$ count of network clock cycles at that time;

d) at the destination node, a controllable oscillator means for generating said destination node clock signal;

e) at the destination node, means for generating a local residual time stamp, said means for generating including second dividing means for dividing said destination node clock signal by a factor of said integer N, and second counting means coupled to the network clock for counting network clock cycles modulo $2^P$; and f) at the destination node, control signal generating means coupled in a feedback loop between said means for generating and said controllable oscillator means, said control signal generating means including first comparison means for comparing a first indication related to said residual time stamp transmitted over the telecommunications network to a second indication related to said local residual time stamp, said control signal generating means for generating feedback control signals to said controllable oscillator means which are used by said controllable oscillator means to adjust said destination node clock signal.

16. A system according to claim 15, wherein:

said first indication related to said residual time stamp transmitted over the telecommunications network is said residual time stamp transmitted over the telecommunications network, and said second indication related to said local residual time stamp is a local RTS value generated by said means for generating a local residual time stamp.

17. A system according to claim 15, wherein:

said first indication related to said residual time stamp transmitted over the telecommunications network is a first comparison between a first value of a residual time stamp transmitted over the telecommunications network and a previous second value of a residual time stamp transmitted over the telecommunications network, and said second indication related to said local residual time stamp is a second comparison between a third value of a local time stamp and a fourth value of a previous local time stamp.

18. A system according to claim 17, wherein:

said integer N is 3008, said modulo $2^P$ count is a modulo sixteen count, said control signal generating means comprises a second comparison means for conducting said first comparison, and a third comparison means for conducting said second comparison, and said second comparison means comprises a mod-16 comparator, and said third comparison means comprises a mod-16 comparator.

19. A system according to claim 15, wherein:

said first comparison means generates error signals which constitute said feedback control signals to said controllable oscillator means.

20. A system according to claim 15, wherein:

said first comparator means generates error signals, and said control signal generating means further comprises filter means for filtering said error signals and generating therefrom said feedback control signals.

21. A system according to claim 15, wherein:

said controllable oscillator means is a digitally controllable oscillator means, and said feedback control signals are digital feedback control signals.

22. A system according to claim 21, wherein:

said controllable oscillator means comprises a first summing means having a scale offset input for summing said digital feedback control signals with said scale offset input to provide a first sum, a second summing means having a second sum output and carry output, a latch means coupled to said second summing means for receiving said second sum output and for providing said second sum output to said second summing means for summing with said first sum, and a dividing means for dividing a fast clock by a first value when said carry output is a first value, and for dividing the fast clock by a second value when said carry output is a second value, an output of said dividing means providing said destination node clock.

23. A method for recovering at a destination node a source clock which has been encoded utilizing the source clock and a system reference clock according to a synchronous residual time stamp (SRTS) algorithm, where the encoding generates residual time stamp (RTS) values which are obtained by a destination node as incoming RTS values, said method comprising:

a) at the destination node, generating local residual time stamp related values by utilizing a controllable destination node clock and the system reference clock;

b) comparing indications relating to the incoming RTS values to indications related to the local RTS related values, and obtaining therefrom a comparison indication;

c) using said comparison indication to generate a control signal; and d) feeding back said control signal to the controllable destination node clock in order to control the output frequency of the controllable destination node clock.

24. A method according to claim 23, wherein:

said indications relating to the incoming RTS values are difference values between a present incoming RTS value and a previous incoming RTS value, and said indications related to the local RTS related values are difference values between a present local RTS value and a previous local RTS value.

\* \* \* \* \*